United States Patent
Kawasaki et al.

(10) Patent No.: US 7,342,669 B2
(45) Date of Patent: Mar. 11, 2008

(54) THREE-DIMENSIONAL SHAPE MEASURING METHOD AND ITS DEVICE

(75) Inventors: Hiroshi Kawasaki, Saitama (JP); Ryo Furukawa, Hiroshima (JP)

(73) Assignee: Technodream21 Inc., Saitama (JP)

( * ) Notice: Subject to any disclaimer, the term of this patent is extended or adjusted under 35 U.S.C. 154(b) by 145 days.

(21) Appl. No.: 10/534,393

(22) PCT Filed: Nov. 13, 2003

(86) PCT No.: PCT/JP03/14469

§ 371 (c)(1),
(2), (4) Date: May 9, 2005

(87) PCT Pub. No.: WO2004/044522

PCT Pub. Date: May 27, 2004

(65) Prior Publication Data

US 2006/0055943 A1    Mar. 16, 2006

(30) Foreign Application Priority Data

Nov. 14, 2002   (JP) ............................... 2002-330582

(51) Int. Cl.
*G01B 11/24* (2006.01)
(52) U.S. Cl. ...................................... 356/606; 356/602
(58) Field of Classification Search ................ 356/601, 356/602, 606; 382/154
See application file for complete search history.

(56) References Cited

U.S. PATENT DOCUMENTS

| | | | |
|---|---|---|---|
| 6,195,455 B1 * | 2/2001 | Mack et al. ................. | 382/154 |
| 2003/0137510 A1 * | 7/2003 | Massen ....................... | 345/420 |

FOREIGN PATENT DOCUMENTS

| | | |
|---|---|---|
| JP | A 10-78304 | 3/1998 |
| JP | A 2000-337834 | 12/2000 |
| WO | WO 97/14015 | 4/1997 |

OTHER PUBLICATIONS

Masahiro Takatsuka, Geoff A.W. West, Svetha Venkatesh, and Terry M. Caelli, "Low-cost Interactive Active Monocular Range Finder," Proceeding of Computer Vision and Pattern Recognition, vol. 1, pp. 444-449, 1999).

* cited by examiner

*Primary Examiner*—Roy M. Punnoose
(74) *Attorney, Agent, or Firm*—Oliff & Berridge PLC

(57) ABSTRACT

A three-dimensional shape is measured by a simple system structure. A three-dimensional shape measuring instrument comprises a device (1-1) in which a light-emitting diode (1-1b) is installed as a marker in a line laser light source (1-1a), an imaging device (1-2), and a computer (1-3). For measurement, a line laser beam from the device (1-1) is applied to an object (1-4) to be measured, the imaging device (1-2) images the applied line laser beam (1-5) and the light-emitting diode, and a three-dimensional shape is obtained from the image data by triangulation by means of the computer (1-3).

7 Claims, 6 Drawing Sheets

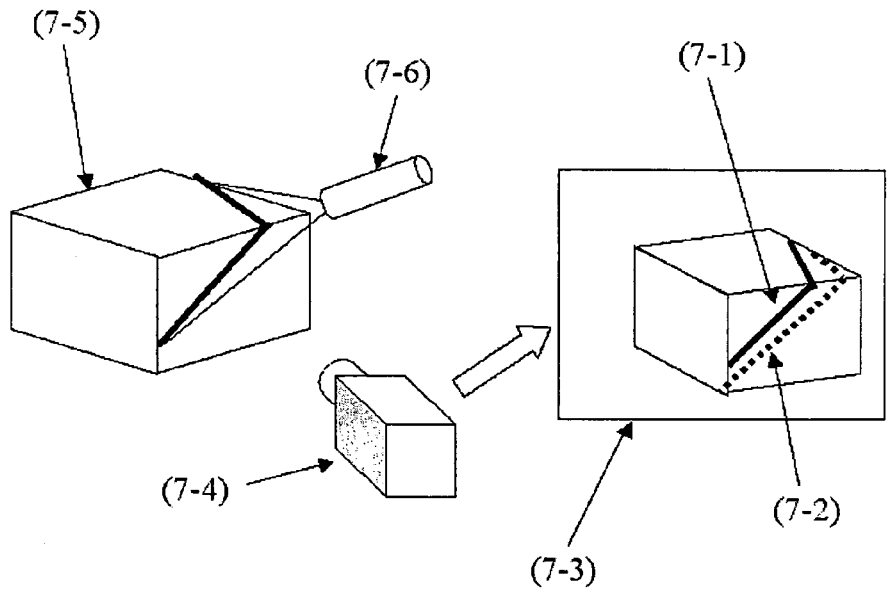

*Explanation of figures*

1-1 3D Measurement device 1-1a line laser projector 1-1b LEDs 1-2 Image capturing device 1-3 Computer 1-4 Target object 1-5 Projected laser light 2-1 3D Measurement device 2-2 Image capturing device 2-3 Computer 2-4 Target object 2-5 Display device 3-1 Squared shape 3-2 x,y,z coordinate shape 3-3 Cube shape 4-1 marker coordinate system 4-2 camera coordinate system 4-3 3D Measurement device 4-4 Target object 4-5 Image plane 5-1 3D Measurement device 5-2a VP 5-2 b VP 5-3 Image plane 5-4 Marker plane 6-1 Detected pixel on image 6-2 Estimated laser plane 6-3 Estimated 3D point 6-4 The line going through the origin of the camera coordinates and the surface point 6-5 Image plane 6-6 3D Measurement device 6-7 Target object

THREE-DIMENSIONAL SHAPE MEASURING METHOD AND ITS DEVICE

BACKGROUND OF THE INVENTION

This invention is related to a 3D measurement system that uses laser-light and estimates depth information of an object by applying a triangulation method; among these systems, this invention is especially related to a 3D measurement system that consists of a single camera to acquire accurate depth information. This invention also relates to a 3D measurement method using the 3D measurement system.

To acquire a 3D shape of the object, an active stereo method based on the triangulation method is well known (pattern projection method and point projection method). These systems consist of light sources, such as laser-lights or halogen lights, and image capturing devices, such as cameras or CCD (Charge-coupled Device) cameras. 3D shape estimation is conducted by a triangulation method of these devices. Therefore, a precise relationship between the light source and the camera should be precalibrated, and thus, the whole system is prone to become large and complicated.

If we can make the calibration process of the light source and the camera easier, an active 3D acquisition system becomes simpler. Based on such an idea, a method was proposed that achieves easy calibration of the light source and the camera by attaching markers on the light source itself and capturing it with a single camera (Masahiro Takatsuka, Geoff A. W. West, Svetha Venkatesh, and Terry M. Caelli. "Low-cost interactive active monocular range finder". In Proceeding of Computer Vision and Pattern Recognition, volume 1, pages 444-449, 1999.).

SUMMARY OF THE INVENTION

Because the Takatsuka method assumes a beam of light for the light source, and thus, 3D information of only a single point can be acquired from a single image, it causes a serious problem because it takes a very long time to capture 3D data of a large area. Another problem of their method is that, because markers attached to the light source are aligned along a single line, the precision of acquired 3D information is inevitably low.

Thus, our invention aims to reduce the capturing time and improve the precision of 3D data of a 3D measurement system based on an active stereo method in which a marker attached light source and a single camera are used.

This invention achieves dense 3D data acquisition from a single image by using a line laser as the light source. With this feature, a 3D shape can be efficiently acquired in a short time. In addition, because of the three-dimensional configuration of the markers, the light source position can be estimated accurately. Thus, the precision of 3D data can be improved.

Because the proposed method can acquire dense 3D points from a single image, if the acquired 3D points include 3D points already estimated in a past procedure, the position of the light source can be corrected by using the 3D points that are already estimated. Because of this, the accuracy of the 3D shape can be improved.

BRIEF DESCRIPTION OF THE DRAWINGS

Figure 1:
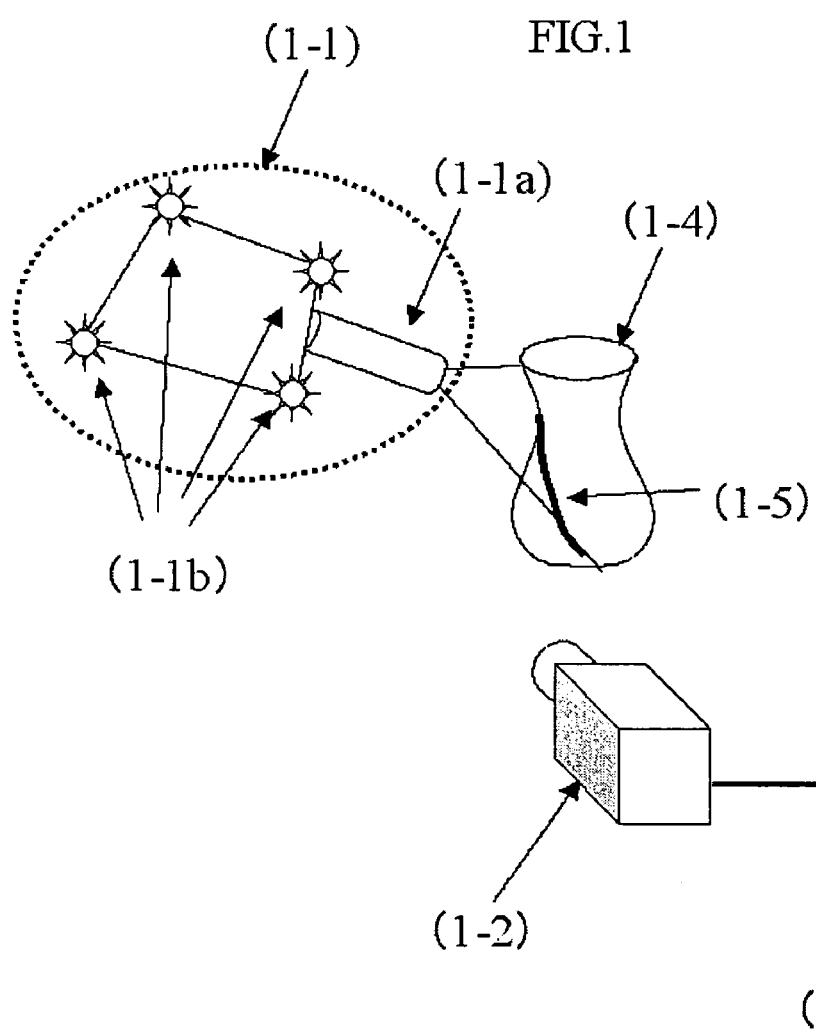

FIG. 1 shows a configuration of measuring devices for image data as a first embodiment of this invention.

Figure 2:
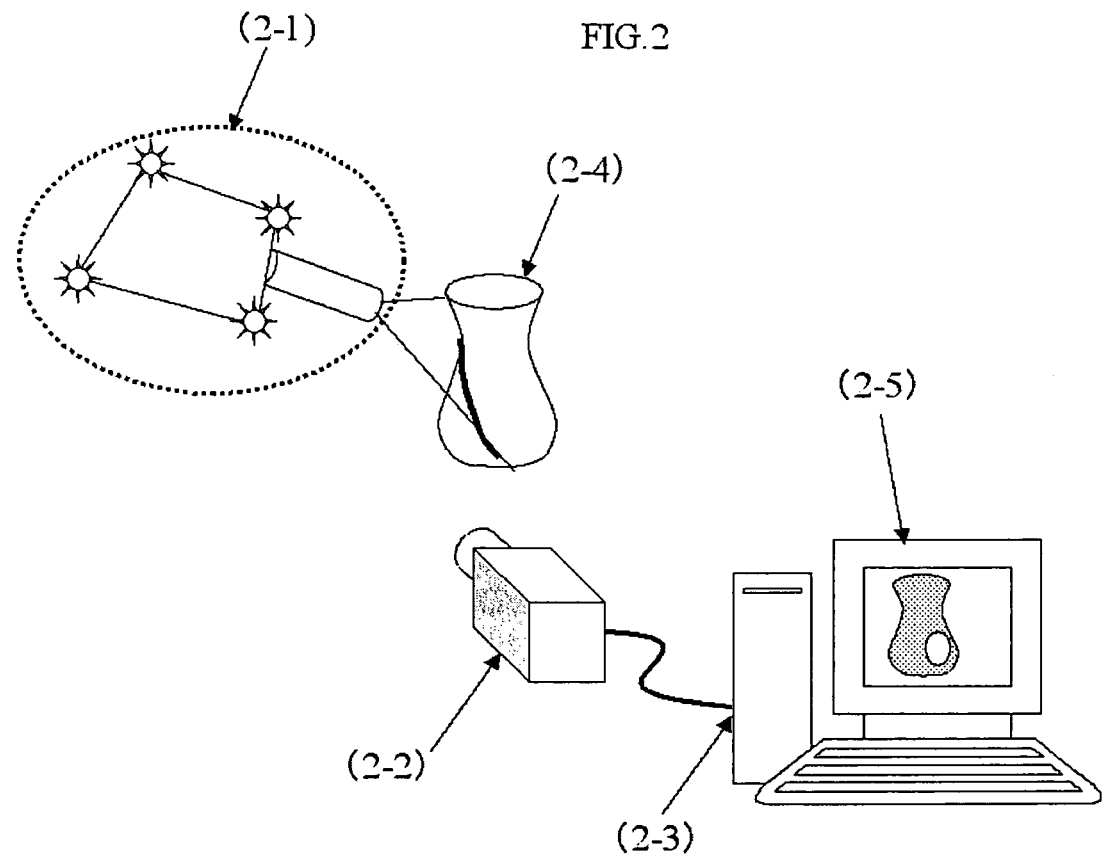

FIG. 2 shows a configuration of the measuring devices for image data as a second embodiment of this invention.

Figure 3:
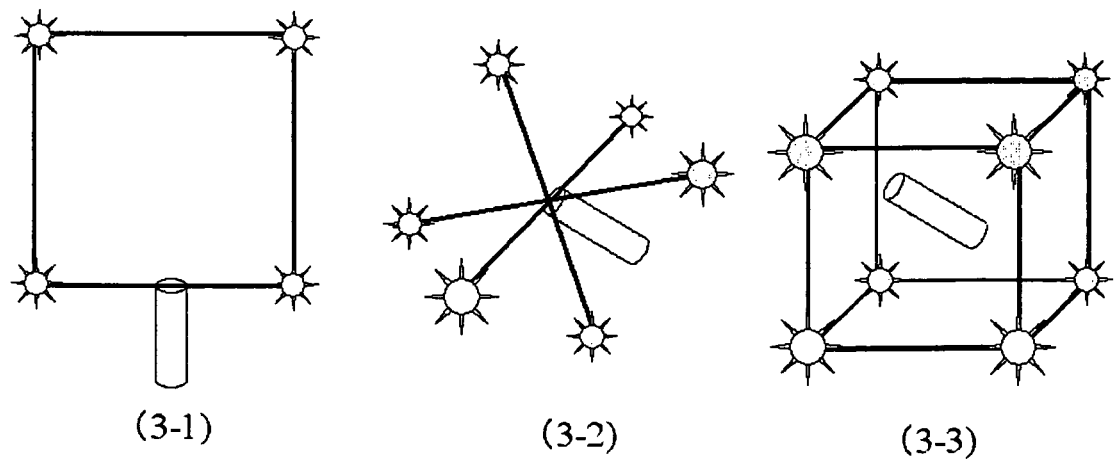

FIG. 3 shows an example of how to arrange the light-emitting diode (LED) markers, which are used in this invention.

Figure 4:
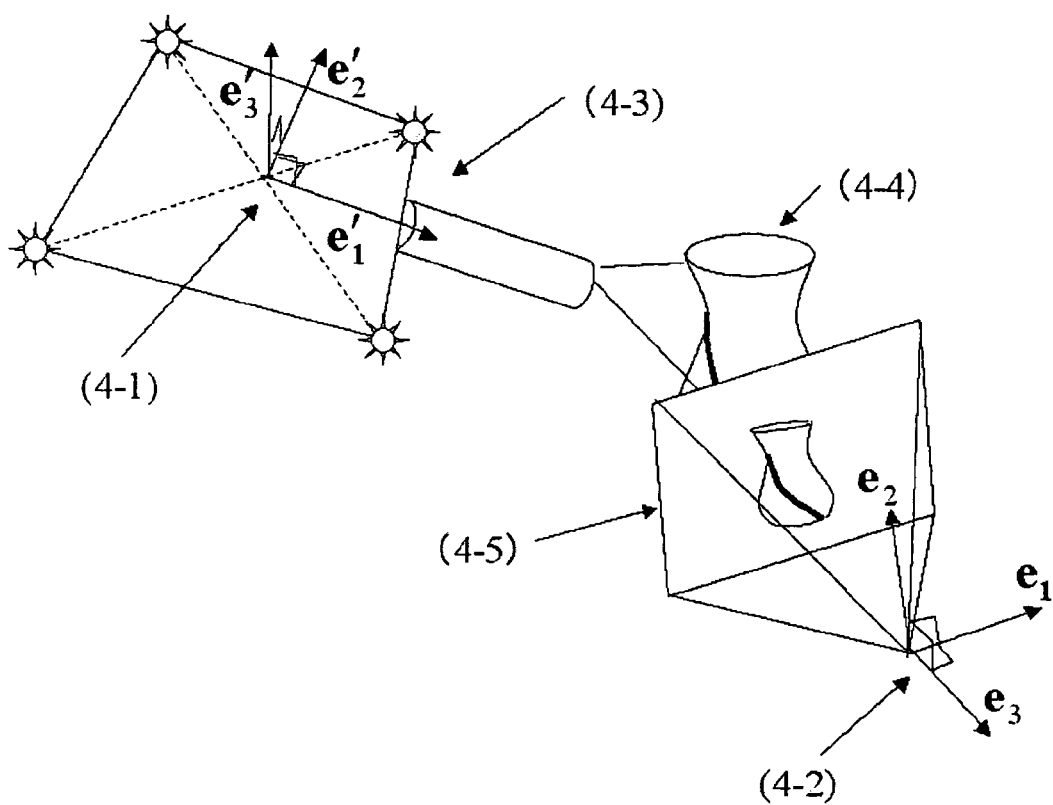

FIG. 4 shows the relationship between the marker coordinate system, which is fixed to the line-laser source, and the camera coordinate system.

Figure 5:
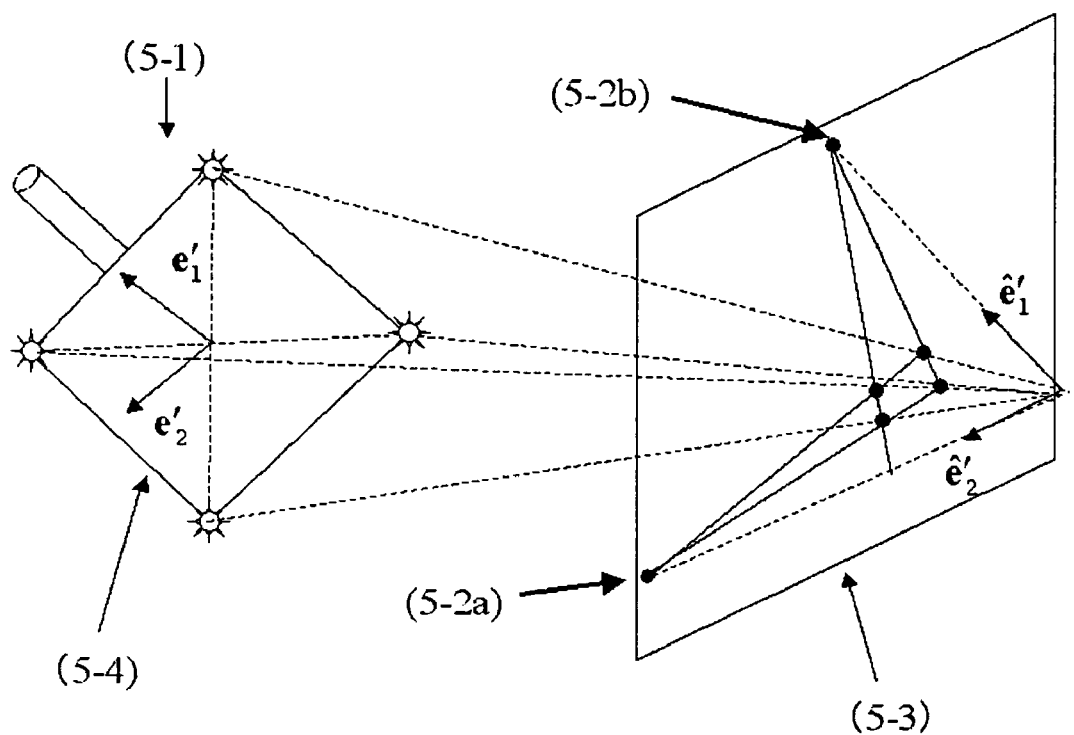

FIG. 5 shows a method for estimating the rotation of the marker coordinate system.

Figure 6:
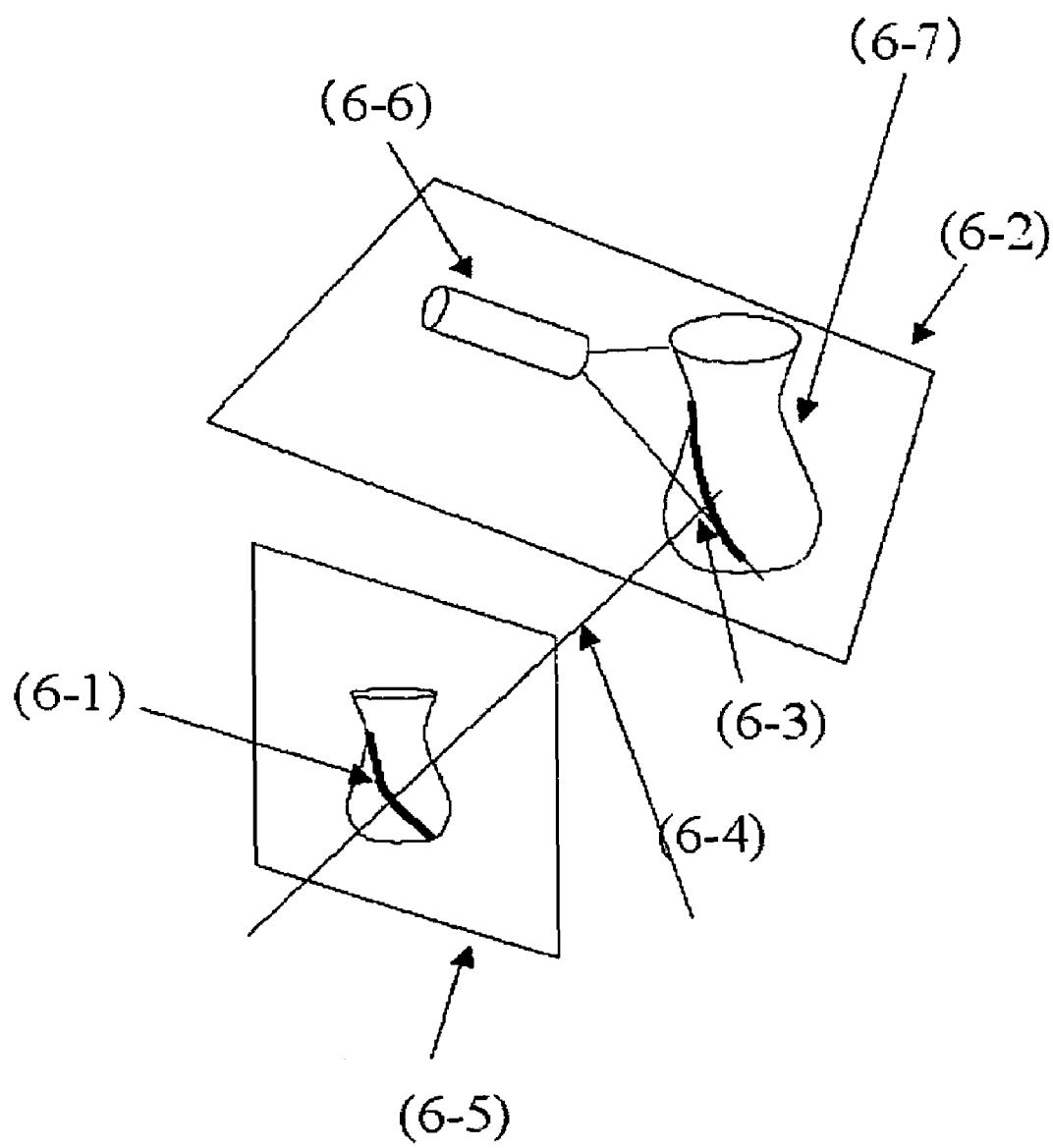

FIG. 6 shows a method for estimating the positions of the 3D points used in this invention.

FIG. 7 shows a method for estimating the difference between the marker plane and the laser plane.

DETAILED DESCRIPTION OF PREFERRED EMBODIMENTS

In the following, an implementation of this invention is described, referring to the figures. First, we disclose the implementation of a 3D measurement process using FIG. 1. At a first step, the users set up all objects so image capturing device (1-2) can capture both the light projecting device (1-1) and the target object (1-4) in a same frame. At the same time, an iris value and shutter speed are adjusted so that the laser light (1-5) projected onto the object and LEDs (1-1b) are accurately and simply detected by cameras using an image processing method. In addition, the relationship between the light projecting device (1-1) and the sheet of light formed by the line laser are measured in advance. In terms of an image capturing device, for example, we can use either a video camera, a CCD camera and so on. At a second step, the users hold the light projecting device (1-1) by hand and project the laser onto the measured object (1-4). Because the 3D configuration of the LEDs is known, by detecting the positions of the LEDs on the image plane, the relationship between the light projecting device (1-1) and the image capturing device (1-2) can be calculated. For calculation, a nonlinear optimization is conducted to improve accuracy.

Because the relationship between the light projecting device (1-1) and the laser plane is known, we can recover a depth of light projected area from the image capturing device (1-2) with a triangulation method using the relationship between the light projecting device (1-1) and the image capturing device (1-2). 3D shapes of the target objects are obtained by repeating the process. If obtained 3D shapes are displayed on a display device (2-5) in real-time as shown in FIG. 2, the users can learn of areas that have not yet been measured on site. Thus, users can efficiently scan the 3D shape of the target object (2-4).

Examples of a marker configuration are shown in FIG. 3. If the number of marker is more than 4, a marker configuration is basically free; however, a square-shaped configuration (3-1), an xyz coordinate-shaped configuration (3-2), and a cube-shaped configuration (3-3) have some advantage, such as easy manufacture and simple calculation for retrieving the relationship between the light projecting device (1-1) and image capturing device (1-2).

In the following, a specfic implementation of a 3D measuring device and the method are described.

Our system consists of a video camera and a laser-projecting device (see FIG. 1). While measuring, the users hold the laser projector by hand and project the laser onto the measured object. The projected stripe is observed by the video camera. The shape of the target object is obtained by analyzing the video sequence. To estimate the position and orientation of the line laser-projecting device, LED markers are attached to the laser projector. LED markers are located so that they form a square and so that the square is placed on the same plane as the sheet of light.

These markers define the local coordinate system in 3D space (4-1). We call this the "marker coordinate system" in this description. The origin of the marker coordinate system is placed at the center of the markers and we define the marker coordinate system by three unit vectors, e1', e2' and e3'. The first and the second vectors, whose directions are expressed by e1' and e2', are taken so that they are parallel to the edges of the square formed by markers. (e1' is parallel to the light projecting direction of the laser projector and e2' is perpendicular to that direction.) The direction of the third vector e3' is orthogonal to the plane formed by the four markers. We also define the camera coordinate system by e1, e2 and e3, where e1 and e2 are respectively parallel to horizontal and vertical directions of the image plane, and e3 directed towards the backward direction of the camera (4-2). The center of the camera coordinate system is defined as the center of the lens. See FIG. 4.

Here, we name two planes. The first one is the plane spanned by e1' and e2', which we call the "marker plane" (5-4). The second one is the plane where the laser light is projected, which we call the "laser plane." The transformation between the "marker plane" and the "laser plane" is represented by a 3D rotation matrix R and translation vector t. This transformation represents the marker positions from the image capturing device. See FIG. 5. When the shape of the target object is scanned, the emitted light from the markers is captured by the video camera. From the captured image frame, the locations of the four LEDs are obtained. In actual implementation, it can be achieved by simple thresholding and calculating the center of gravity of the connected pixels. By using the locations of the LED markers, a description of the lines on the image that go through the markers is calculated and the crossing points of the lines are also calculated. The crossing points are called Vanishing Points (VP). (5-2a) and (5-2b). If the lines are parallel on the image, the VP is defined as the point at infinity at the direction of the parallel lines. Let the 2D coordinates of these vanishing points be described as $(g_{0n}, g_{1n})$ (n=0,1) in pixels, then, the 3D direction vectors (r1 and r2) of those VPs are $$r_n = (g_{0n}, g_{1n}, -f)^t \qquad (1)$$

where f denotes focal length in pixel and $^{ot}$ denotes transpose of vectors and matrices. We define $\hat{e}'_i = r_i / \|r_i\|$, (i=1,2). The unit vectors $\hat{e}'_i$ are used as an estimation of $e'_i$. Estimation $\hat{e}'_3$ is defined by taking a cross product of the two unit vectors as $\hat{e}'_3 = \hat{e}'_1 \times \hat{e}'_2$. FIG. 5 shows relationships between VP and estimations $\hat{e}'_i$, (i=1,2). Using three unit vectors, estimated $\hat{R}$ of rotation matrix R can be described as:

$$\hat{R} = (\hat{e}_1, \hat{e}_2, \hat{e}_3). \qquad (2)$$

Let 2D coordinates of images of first and second markers be $(p_{11}, p_{12})$, $(p_{21}, p_{22})$. 3D locations in camera coordinates of the markers are $$m_1 = (p_{11}u, p_{12}u, -fu)^t, m_2 = (p_{21}v, p_{22}v, -fv)^t \qquad (3)$$

where u, v are unknown variables. Let the 3D distance between those markers, which is known value, be Dm. Then $$\|m_1 - m_2\| = D_m. \qquad (4)$$

The equation of the marker plane is expressed as $e'_{31}{}^t x + d = 0$, where x is a 3D point expressed in camera coordinates. Because $m_1, m_2$ are on the marker plane, $$e'_{31}{}^t m_i + d = 0 (i=1,2). \qquad (5)$$

From equations (3) (4) and (5), d,u,v can be solved. Then we obtain $\hat{t}$, as an estimation of t, by calculating the center of gravity of locations of the markers.

To improve the estimation of the parameters of transformation, we optimize it with a nonlinear optimization. The evaluation function for optimization is defined as the sum of the squared distances between the actual LED positions on the image and the estimated marker positions on the image, which are calculated by projecting the LED position in local coordinates to the image plane by using estimated $\hat{R}$ and $\hat{t}$. The function is described as $$f(\hat{R}, \hat{t}) = \sum_i \{\text{proj}(\hat{R} m_i' + \hat{t}) - p_i\} \qquad (6)$$

$$\text{proj}((x_1, x_2, x_3)^t) = ((fx_1)/x_3, (fx_2)/x_3)^t \qquad (7)$$

where $p_i$ is a location of the image of the i th marker, and $m'_i$ is a location of the i th detected marker in marker coordinates. proj ( ) is an operation of projection from 3D position in camera coordinates into image coordinates. For actual implementation, we can use a simplex descending algorithm for the optimization.

Then, using the estimated parameters of the marker plane, we can estimate the parameter of the laser plane. A detailed method will be described later. First, the pixels that are projected by laser light (6-1) are extracted from the image (6-5). The pixels are easily picked up by a simple thresholding method, however, for actual implementation, skeletonizing and/or morphological filters are applied to improve accuracy. The line going through the origin of the camera coordinates (6-4) and the surface point (line of sight) can be calculated for each pixel using intrinsic parameters, and the 3D location of the surface (6-3) can be determined by taking the intersection of the line of sight and the estimated laser plane (6-2). FIG. 6 shows how to estimate surface locations by triangulation.

Here, we explain the method to acquire a correct relationship between the marker coordinates and the laser plane. The relationship can be defined as the parameters of the laser plane expressed in marker coordinates. The parameters can be expressed by (a, b, c, d) which represents a plane in 3D space. If the markers plane precisely corresponds to the laser plane, the equation of the laser plane is z=0.

For preparation of the calibration between the marker coordinates and the laser plane, the following measurement must be conducted in advance. First, a box-shaped object (7-5), of a known size, is captured. From the image, the extrinsic camera parameters are estimated using methods of camera calibration. From the extrinsic camera parameters and the size, the equations of the planes enveloping the box are estimated.

We project the laser light onto the surface of the target object, and capture the lit surface and the markers. From the markers, the transformation between the marker coordinates and camera coordinates can be estimated by the previously described method. Then, the laser plane expressed in the camera coordinates can be calculated from the estimated laser plane parameters (a, b, c, d) expressed in marker coordinates. Next, the intersecting lines of the laser plane and the surface of the box shaped object are calculated. Then, the images of the lines can be determined (7-2).

We calculate the intersection of the laser plane estimated by the above method and the box-shaped object. Then, we estimate the image of the intersection and compare the image with the true positions of the image of the surface points lit by the laser (7-1). The squared distances between the pixels of the true image and the estimated image are summed up for all the pixels. The sum is the estimation function of the parameters (a, b, c, d), which depicts the laser plane expressed in the marker coordinates. By minimizing the estimation function using a non-linear optimization method, we can estimate (a, b, c, d). The initial value for the optimization can be, for example, z=0, which is equivalent with (a,b,c,d)=(0,0,1,0). See FIG. 7.

Finally, we describe a method to correct the estimation of the marker coordinate system from known 3D points. When the 3D locations of some part of the measured surface are known and if some part of the projected stripe of the laser is on the region of surface whose depth values are known, the known depth value and the depth value calculated from the estimated laser plane should match. Suppose we define an estimation function that is the sum of function (6) and the sum of squared differences between the known depth value and the calculated depth value expressed above. The summation of the squared differences is calculated for all the region of the surface whose depth values are known. Then, we can correct the estimation of the marker coordinate system by minimizing the estimation function. As for the known 3D points, we can use the 3D points precisely measured by other methods. Another example for the known 3D points is that we can select points that are measured many times and the variances of whose positions are small.

As explained above, applying this invention, we can quickly acquire a precise 3D shape without using complex equipment, which is conventionally required for active 3D measurement by triangulation. Moreover, the users can interactively check the regions whose positions are not measured during the measuring process by displaying the acquired 3D positions in real-time; thus, measurement of 3D shape of the target object becomes efficient.

The invention claimed is:

1. An apparatus for 3D shape measurement, comprising:
   a laser projecting device including a line-laser projector and LEDs attached to the line-laser projector as markers for estimating the position and orientation of the laser projecting device;
   an image capturing device for capturing the laser projecting device and a target object; and
   a computer for detecting a projected line-laser light and LEDs from a captured image and processing the image to compute a 3D shape measurement.

2. The apparatus for 3D shape measurement defined in claim 1, further comprising a display device for displaying the 3D shape captured by the apparatus.

3. A method for 3D measurement using the apparatus of claim 1, the method comprising:
   projecting a line-laser to an object, the apparatus having LEDs attached to the line-laser projector for estimating the position and orientation of the laser projecting device;
   capturing projected line-laser light and the LEDs at the same time using the image capturing device;
   calculating, using the computer, a 3D shape of the object from the captured image using a triangulation method; and
   outputting the calculated 3D shape.

4. A method and a system for displaying information, comprising:
   means for processing the steps defined in claim 3 in real-time; and
   means for displaying the 3D shape acquired by the previously defined steps on a display device.

5. A method for improving 3D shape using a triangulation method, the method comprising:
   selecting 3D points precisely measured previously or 3D points with high accuracy from the 3D shape acquired by the method of claim 3 as known 3D points;
   calculating a difference between the 3D depth value of a known 3D point and the 3D depth value estimated by the method of claim 3 as an error function; and
   correcting the position and orientation of the laser projecting device by minimizing the error function.

6. The method of claim 5, wherein the known 3D points are based on points that are measured many times and the variances are small.

7. The method of claim 5, wherein the known 3D points are measured using an active stereo method based on triangulation.

* * * * *